United States Patent
Zortea et al.

(10) Patent No.: US 9,350,399 B1
(45) Date of Patent: May 24, 2016

(54) METHOD AND APPARATUS FOR BASEBAND PROCESSING AN ANALOG SIGNAL IN A DIRECT CONVERSION RADIO RECEIVER

(71) Applicant: PMC-SIERRA US, INC., Sunnyvale, CA (US)

(72) Inventors: Anthony Eugene Zortea, Pipersville, PA (US); Mark Hiebert, New Westminster (CA)

(73) Assignee: Microsemi Storage Solutions (U.S.), Inc., Aliso Viejo, CA (US)

( * ) Notice: Subject to any disclaimer, the term of this patent is extended or adjusted under 35 U.S.C. 154(b) by 0 days.

(21) Appl. No.: 14/578,311

(22) Filed: Dec. 19, 2014

(51) Int. Cl.
*H04B 1/10* (2006.01)
*H04B 1/26* (2006.01)

(52) U.S. Cl.
CPC .................................. *H04B 1/1027* (2013.01)

(58) Field of Classification Search
CPC ............. H04B 1/10; H04B 1/12; H04B 1/123
USPC ......................................... 455/303–306, 324
See application file for complete search history.

(56) References Cited

U.S. PATENT DOCUMENTS

| | | | |
|---|---|---|---|
| 7,127,653 B1 | 10/2006 | Gorshe | |
| 8,457,578 B2 | 6/2013 | Burke et al. | |
| 8,542,616 B2 | 9/2013 | Staszewski et al. | |
| 2004/0038652 A1* | 2/2004 | Khlat | H04B 1/30 455/130 |
| 2009/0190633 A1* | 7/2009 | Smith | H04B 1/123 375/148 |

FOREIGN PATENT DOCUMENTS

WO 2004/098080 A1 11/2004

OTHER PUBLICATIONS

Grunnet-Jepsen, A. et al., "Fibre Bragg grating based spectral encoder/decoder for lightwave CDMA", Electronics Letters, vol. 35, No. 13, Jun. 24, 1999, pp. 1096-1097.

* cited by examiner

*Primary Examiner* — Lee Nguyen
(74) *Attorney, Agent, or Firm* — Dennis R. Haszko

(57) ABSTRACT

A method and apparatus are provided for reducing aliasing in a direct conversion (or zero-IF) radio receiver having high and low frequency paths. According to an implementation, a non-transitory machine-readable memory stores aliasing correlation response data that associates a measured non-aliased signal in a high frequency path and a measured aliased residual of the signal in a low frequency path. A compensator is in communication with the memory to apply aliasing compensation to received signals based on the stored aliasing correlation response data. In an example implementation, the low and high frequency paths are independently optimized for low and high frequency performance, respectively, and have transfer functions that overlap with one another to create a calibration zone used to calibrate the first and second transfer functions.

14 Claims, 14 Drawing Sheets

METHOD AND APPARATUS FOR BASEBAND PROCESSING AN ANALOG SIGNAL IN A DIRECT CONVERSION RADIO RECEIVER

FIELD

The present disclosure relates to the wireless and mobile semiconductor industry, including but not limited to baseband processing of an analog signal in a direct conversion radio receiver.

BACKGROUND

Direct conversion, or Zero-IF (ZIF), radio receivers are well known in the industry and offer many benefits over heterodyne and other receiver architectures. In particular, the problem of image is entirely eliminated, and the IF or baseband filtering is simplified and can be easily integrated onto silicon devices.

FIG. 1 shows two signal graphs 10 and 20. These graphs illustrate a desired band 12 and an image 14, and show how the image 14 becomes noise after heterodyne mixing. In a "homodyne", or ZIF receiver, $\omega LO=\omega 1$, and so there is no image. This advantage for ZIF receivers comes at a cost: the down-converted signal now has content extending down to zero frequency. This requires that any analog processing have good noise properties at very low frequencies. This frequency range is where amplifier flicker noise is problematic.

There is a trend in the industry for increasing data rates to the mobile or wireless user, which translates to increased amplifier bandwidth requirements for the ZIF radio receiver.

ZIF radio receiver baseband processing is intended to provide good low frequency noise performance and high bandwidth.

Low frequency noise is usually dominated by the flicker noise performance of an analog amplifier. Flicker noise can be reduced by increasing the size of transistor devices in an amplifier, but this is traded-off with high frequency performance because the large size introduces large parasitic capacitances which reduce amplifier bandwidth. This loss of bandwidth can be reduced by increasing the dissipated power of the amplifier, but this is contraindicated by the need for lower power in wireless and mobile applications.

Improvements are desirable that allow good low frequency noise performance and high amplifier bandwidth at low dissipated power levels.

BRIEF DESCRIPTION OF THE DRAWINGS

Embodiments of the present disclosure will now be described, by way of example only, with reference to the attached Figures.

DETAILED DESCRIPTION

Figure 1:
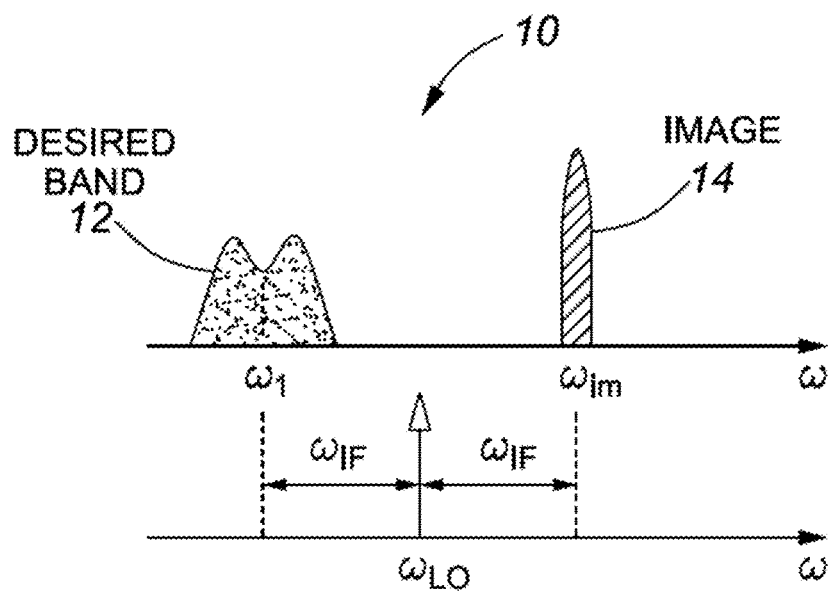
FIG. 1 shows graphs illustrating how an image becomes noise after heterodyne mixing.
Figure 1:
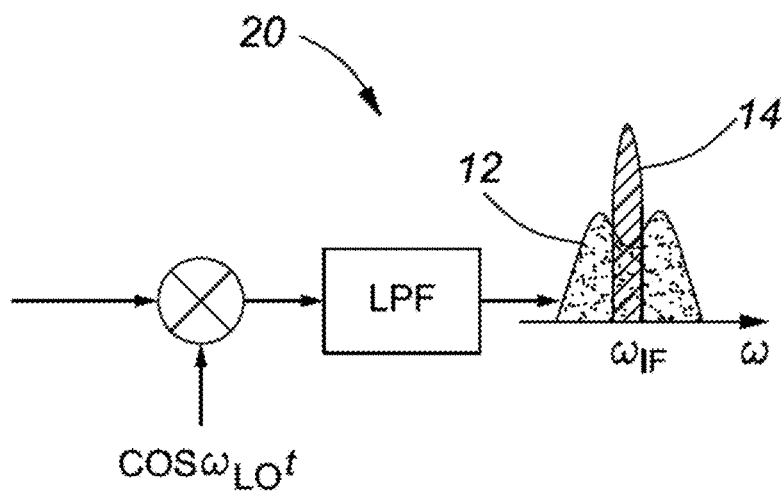

A method and apparatus are provided for reducing aliasing in a direct conversion (or zero-IF) radio receiver having high and low frequency paths. According to an implementation, a non-transitory machine-readable memory stores aliasing correlation response data that associates a measured non-aliased signal in a high frequency path and a measured aliased residual of the signal in a low frequency path. A compensator is in communication with the memory to apply aliasing compensation to received signals based on the stored aliasing correlation response data. In an example implementation, the low and high frequency paths are independently optimized for low and high frequency performance, respectively, and have transfer functions that overlap with one another to create a calibration zone used to calibrate the first and second transfer functions.

Embodiments of the present disclosure relate to a method and apparatus baseband processing of an analog signal in a direct conversion radio receiver. For example, embodiments of the present disclosure provide baseband diplexing for low power ZIF radio receivers.

In an implementation, an analog baseband signal of a zero-IF radio receiver is diplexed into two overlapping spectra and recombined in the digital domain to: relax flicker noise requirements; increase bandwidth; and/or reduce the total dissipated power of the receiver. In an implementation, overlapping spectra of the diplexed signals allow for efficient calibration and matching of the 2 branches.

In an embodiment, the present disclosure provides a method of reducing aliasing during signal processing at a direct conversion radio receiver having a low frequency path and a high frequency path. The method comprises: receiving a first signal, the first signal having no content in a low frequency band associated with the low frequency path; measuring the first signal in the high frequency path, the first signal being non-aliased in the high frequency path; measuring an aliased residual of the first signal in the low frequency path; determining an aliasing correlation based on a relationship between the measured non-aliased first signal and the measured aliased residual of the first signal; and applying aliasing compensation to a second received signal based on the determined aliasing correlation.

In an example embodiment, the first signal is received in an analog baseband section of the direct conversion radio having a low frequency path and a high frequency path, the low and high frequency paths being independently optimized for low and high frequency noise performance, respectively.

In an example embodiment, the first signal is a test signal provided at a frequency that is higher a transfer function associated with the low frequency path such that it is filtered out of the low frequency path and generates the aliased residual signal that is unfiltered by the transfer function associated with the low frequency path.

In an example embodiment, the method further comprises storing the measured first signal, the measured aliased residual of the first signal, and the determined aliasing correlation in a non-transitory machine readable memory in a digital signal processor (DSP).

In an example embodiment, the method further comprises: filtering a high-frequency path component of the second received signal using the determined aliasing correlation; and subtracting the filtered high-frequency path component of the second received signal from a low-frequency component of the second received signal in the low-frequency path to produce an aliasing-reduced version of the second received signal.

In an example embodiment, the method further comprises: obtaining aliasing correlation response data associating the measured non-aliased first signal in the high frequency path and the measured aliased residual of the signal in the low frequency path, and the aliasing correlation is determined based on the obtained aliasing correlation response data.

In another embodiment, the present disclosure provides a non-transitory machine readable medium having stored thereon statements and instructions for execution by a processor to perform a method of reducing aliasing during signal processing at a direct conversion radio receiver having a low frequency path and a high frequency path. The processor-implemented method comprises: receiving a first signal, the first signal having no content in a low frequency band associated with the low frequency path; measuring the first signal in the high frequency path, the first signal being non-aliased in the high frequency path; measuring an aliased residual of the first signal in the low frequency path; determining an aliasing correlation based on a relationship between the measured non-aliased first signal and the measured aliased residual of the first signal; and applying aliasing compensation to a second received signal based on the determined aliasing correlation.

In a further embodiment, the present disclosure provides a digital signal processor for use in a direct conversion radio receiver having a low frequency path and a high frequency path. The DSP comprises: an aliasing identifier in communication with the low frequency path and the high frequency path to obtain aliasing correlation response data associating a measured non-aliased signal in the high frequency path and a measured aliased residual of the signal in the low frequency path. The DSP also comprises a compensator in communication with the aliasing identifier to apply aliasing compensation to received signals based on the obtained aliasing correlation response data.

In an example embodiment, the DSP further comprises a non-transitory machine-readable memory in communication with the aliasing identifier and configured to store the obtained aliasing correlation response data.

In an example embodiment, the DSP further comprises: a calibration controller in communication with the high frequency path; and a calibration filter in communication with the low frequency path and with the calibration controller to adjust a frequency response of the low frequency path until the frequency response of the low frequency path sufficiently matches the frequency response of the high frequency path in a calibration zone.

In an example embodiment, the DSP further comprises a high pass filter in the high frequency path, and the calibration controller receives an output of the calibration filter as an input, and compares the amplitude and phase of the calibration filter output to the amplitude and phase of an output of the high pass filter. The calibration controller adjusts the calibration filter until the output of the calibration filter matches the output of the high pass filter.

In an embodiment, the present disclosure provides a direct conversion radio receiver comprising: a high frequency content path comprising first analog circuitry configured to filter and process high frequency content of the analog signal; a low frequency content path comprising second analog circuitry configured to filter and process low frequency content of the analog signal, the second analog circuitry configured to process the low frequency content separate from and in parallel with the processing of the high frequency content by the first analog circuitry; and a digital signal processor. The DSP includes: a non-transitory machine-readable memory storing aliasing correlation response data associating a measured non-aliased signal in the high frequency path and a measured aliased residual of the signal in the low frequency path; and a compensator in communication with the memory to apply aliasing compensation to received signals based on the stored aliasing correlation response data.

In an example embodiment, the direct conversion radio receiver further comprises: an aliasing identifier in communication with the low frequency path and the high frequency path to obtain the aliasing correlation response data.

In another embodiment, the present disclosure provides an analog baseband circuit for use in processing an analog signal in a direct conversion radio receiver. The circuit comprises: a high frequency content path comprising first analog circuitry configured to filter and process high frequency content of the analog signal; and a low frequency content path comprising second analog circuitry configured to filter and process low frequency content of the analog signal. The second analog circuitry is configured to process the low frequency content separate from and in parallel with the processing of the high frequency content by the first analog circuitry.

In an example embodiment, the high frequency content path is characterized by a first transfer function, and the low frequency content path is characterized by a second transfer function that overlaps with the first transfer function to create a calibration zone used to calibrate the first and second transfer functions.

In an embodiment, the present disclosure provides a method of baseband processing an analog signal in a direct conversion radio receiver, the method comprising: pseudo-diplexing the analog signal into low frequency content and high frequency content; processing the low frequency content using first analog circuitry that is optimized for low frequency performance; and separately processing the high frequency content using second analog circuitry that is optimized for high frequency performance.

In an example embodiment, pseudo-diplexing comprises diplexing the analog signal into two overlapping spectra; and recombining the processed low frequency content and the separately processed high frequency content in a digital domain.

In another embodiment, the present disclosure provides a direct conversion radio receiver comprising: first and second analog paths configured to separate a single analog baseband signal into first and second frequency components; first analog circuitry provided in the first analog path and configured to filter and process the first frequency component of the analog signal; and second analog circuitry provided in the second analog path and configured to filter and process the second frequency component of the analog signal. The second analog circuitry is configured to process the second frequency component separate from and in parallel with the processing of the first frequency component by the first analog circuitry.

In an example embodiment, the first and second analog circuitry cooperate to diplex the single analog signal into first and second frequency components having overlapping spectra.

In an example embodiment, the first and second analog circuitry cooperate to recombine the processed low frequency content and the separately processed high frequency content in a digital domain.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described.

A discussion of ZIF receivers and existing approaches will be provided prior to discussing embodiments of the present disclosure in detail.

Figure 2:
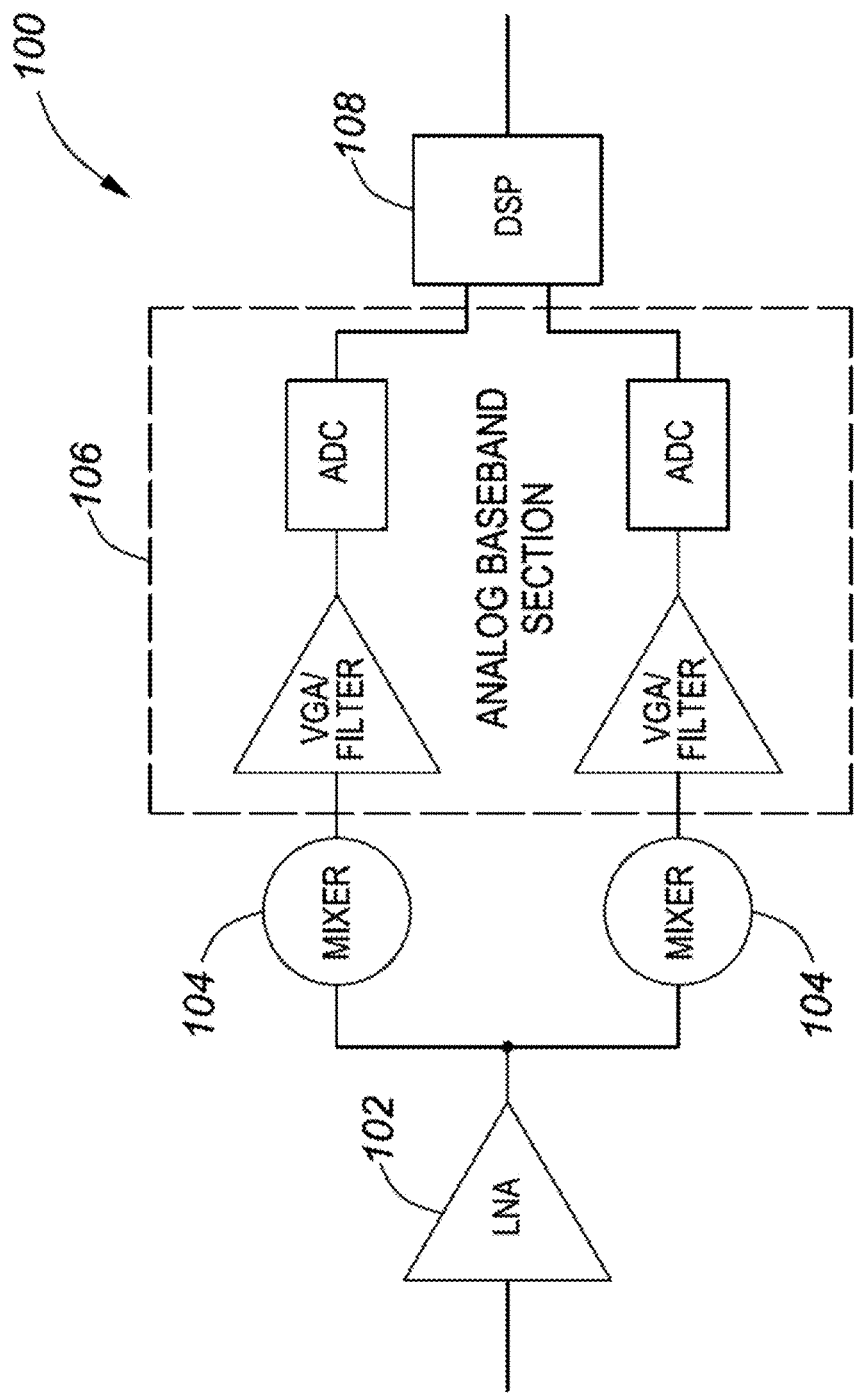
FIG. 2 illustrates a basic architecture of a known ZIF receiver, with the analog baseband section highlighted.

FIG. 2 illustrates a basic architecture of a known ZIF receiver 100. A low noise amplifier 102 is provided, the output of which is sent to inputs to two mixers 104. The mixer in-phase and quadrate, or "I" and "Q", outputs are provided as inputs to an analog baseband section 106, the outputs of which are provided to a digital signal processor (DSP) 108. Since embodiments of the present disclosure relate primarily to the analog baseband section 106 of the receiver 100, further details of a typical analog baseband section will now be described.

Figure 3:
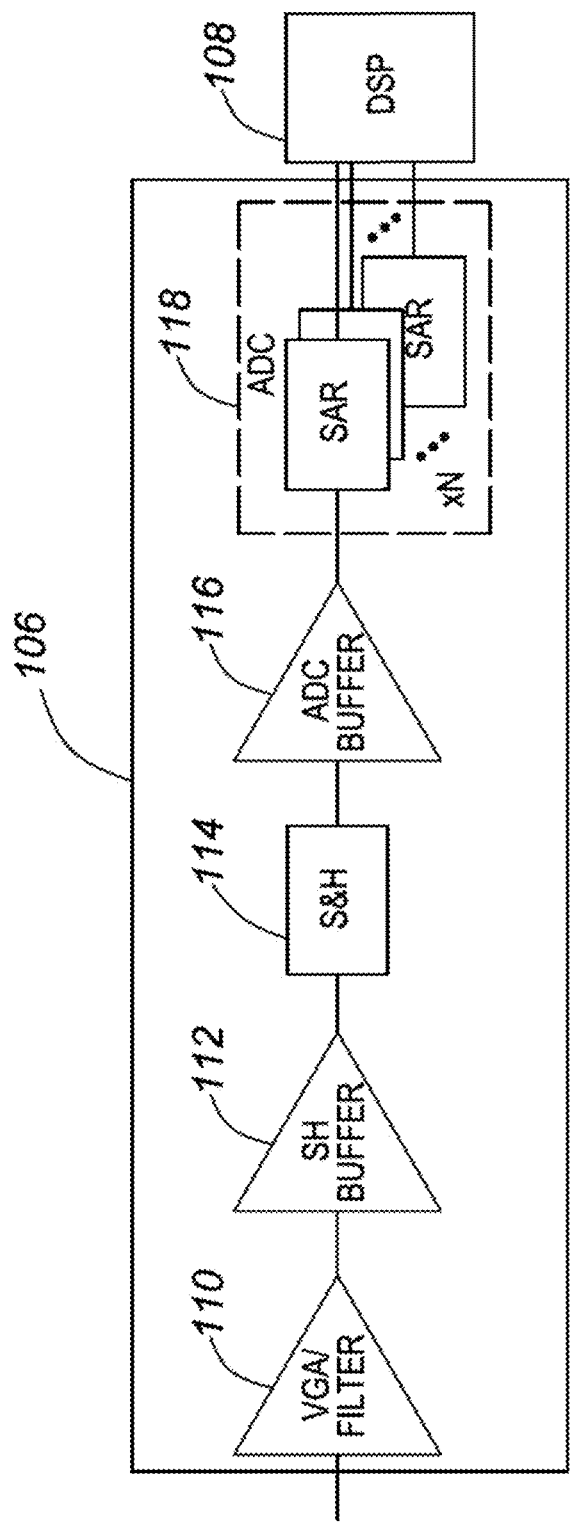
FIG. 3 illustrates a detailed view of an analog baseband section of a ZIF radio.

FIG. 3 illustrates a detailed view of an analog baseband section 106 of a ZIF radio. Note that only the in-phase, or "I" arm is illustrated, for simplicity and clarity of illustration. Each arm of the analog baseband section 106 includes two amplifiers, a VGA/Filter 110 and an sample and hold (S&H) buffer 112, followed by a sample and hold block 114, and an analog to digital converter (ADC) buffer amplifier 116, the output of which is provided to an ADC block 118. While a successive approximation register (SAR) ADC is illustrated in the example embodiment of FIG. 3, any type of ADC can be used. In FIG. 3, it is the flicker noise and bandwidth of the 3 amplifiers (VGA 110, S&H Buffer 112, and ADC Buffer 116) that are optimized according to embodiments of the present disclosure while keeping dissipated power low.

Figure 4:
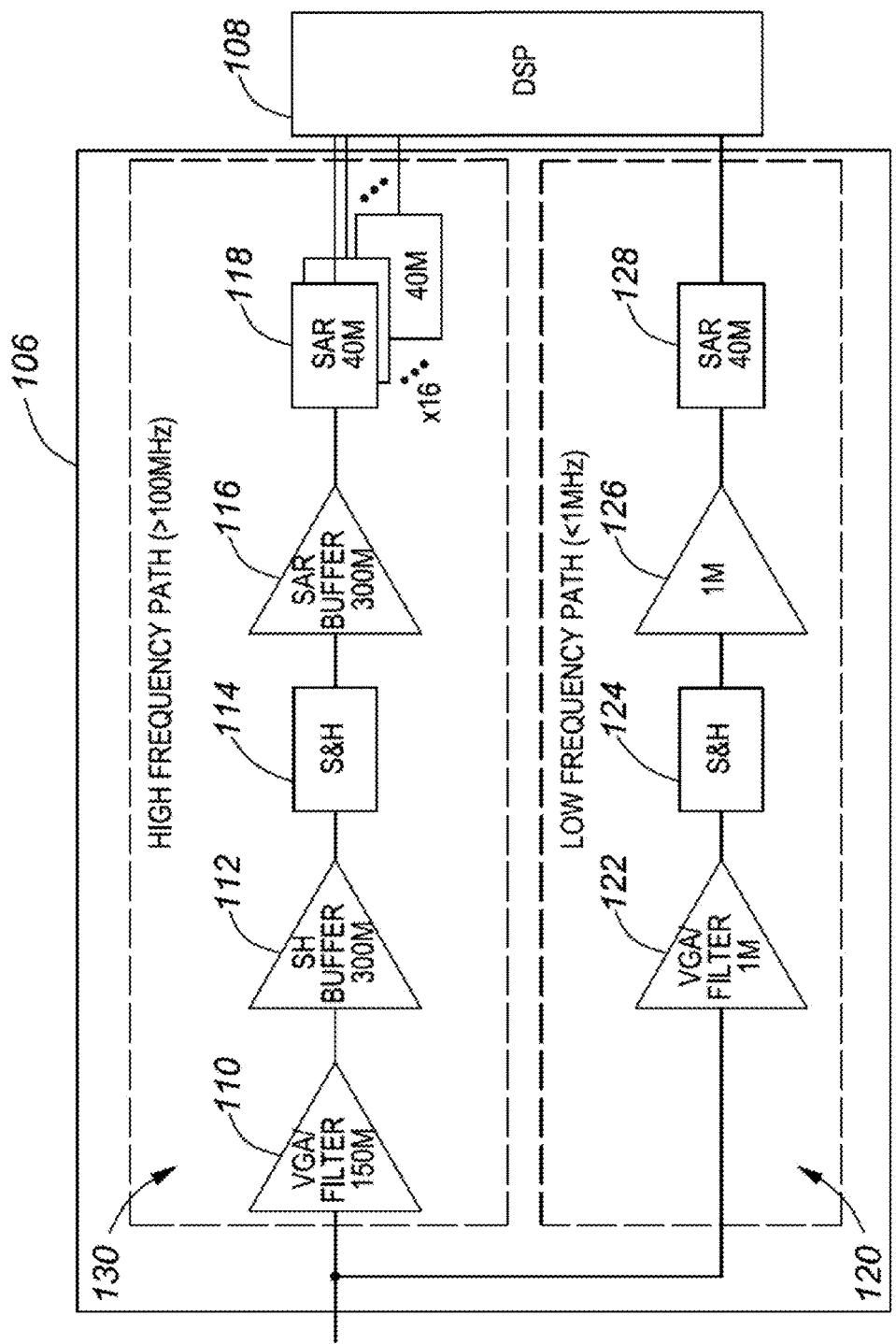
FIG. 4 illustrates an analog baseband section of a ZIF radio according to an embodiment of the present disclosure.

FIG. 4 illustrates the "I" or "Q" portion of the analog baseband section 106 of a ZIF radio according to an embodiment of the present disclosure. As shown in FIG. 4, a second parallel path 120 is introduced to each arm in the analog baseband section 106, in addition to the original path 130 described in relation to FIG. 4. In the example embodiment shown in FIG. 4, the second parallel path 120 is a low frequency path comprising a low frequency optimized VGA 122, a low frequency optimized sample & hold block 124, a low frequency optimized ADC buffer 126, and a low frequency optimized ADC 128, such as an SAR ADC. In this manner, each of the two paths can be optimized independently, the path 130 for high frequency performance, and the path 120 for low frequency noise performance. The two paths 120 and 130 can then be combined into a single path in DSP 108.

As explained above, it is expensive from a power perspective to achieve both relative high bandwidth and relative low flicker noise, simultaneously, in the same circuit. Embodiments of the present disclosure solve this problem by pseudo-diplexing the analog signal and separately processing the low and high frequency content using analog circuitry that is optimized for low or high frequency performance. The "pseudo" nature of the diplexing will be explained below.

In an example embodiment involving an LTE-Advance capable radio receiver, such as shown in FIG. 4, the high frequency path is optimized for >100 MHz of bandwidth, without concern for the low frequency flicker noise performance. The low frequency path is designed to have good flicker noise performance but it only requires ~1 MHz bandwidth. The frequency values on the labels of elements in FIG. 4 are only examples, and any values may be used, so long as they contribute to high or low frequency optimization, respectively.

The two paths 120 and 130 shown in FIG. 4 illustrate high and low frequency paths of an analog baseband section 106 of a ZIF radio 100 according to an embodiment of the present disclosure. There are certain aspects to be addressed in order to make this two-path arrangement beneficial: recombining the two paths so that minimum noise and distortion are introduced and so that the combined frequency response sufficiently matches the frequency response if there were no duplexing; efficiently diplexing the baseband analog input signal; and dealing with aliasing in the low frequency path. First, a detailed description of the signals is provided.

Figure 5:
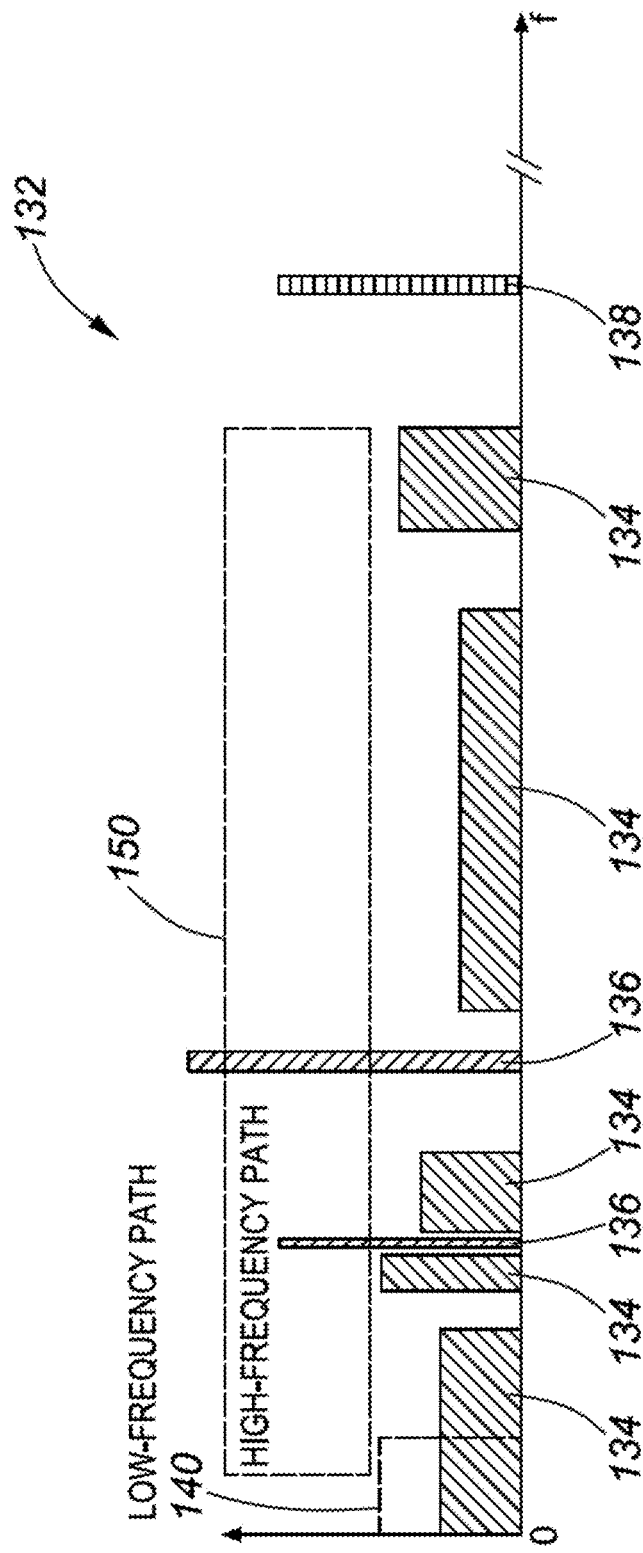
FIG. 5 illustrates an input signal spectrum showing the frequency range of the high and low frequency paths.
Figure 6:
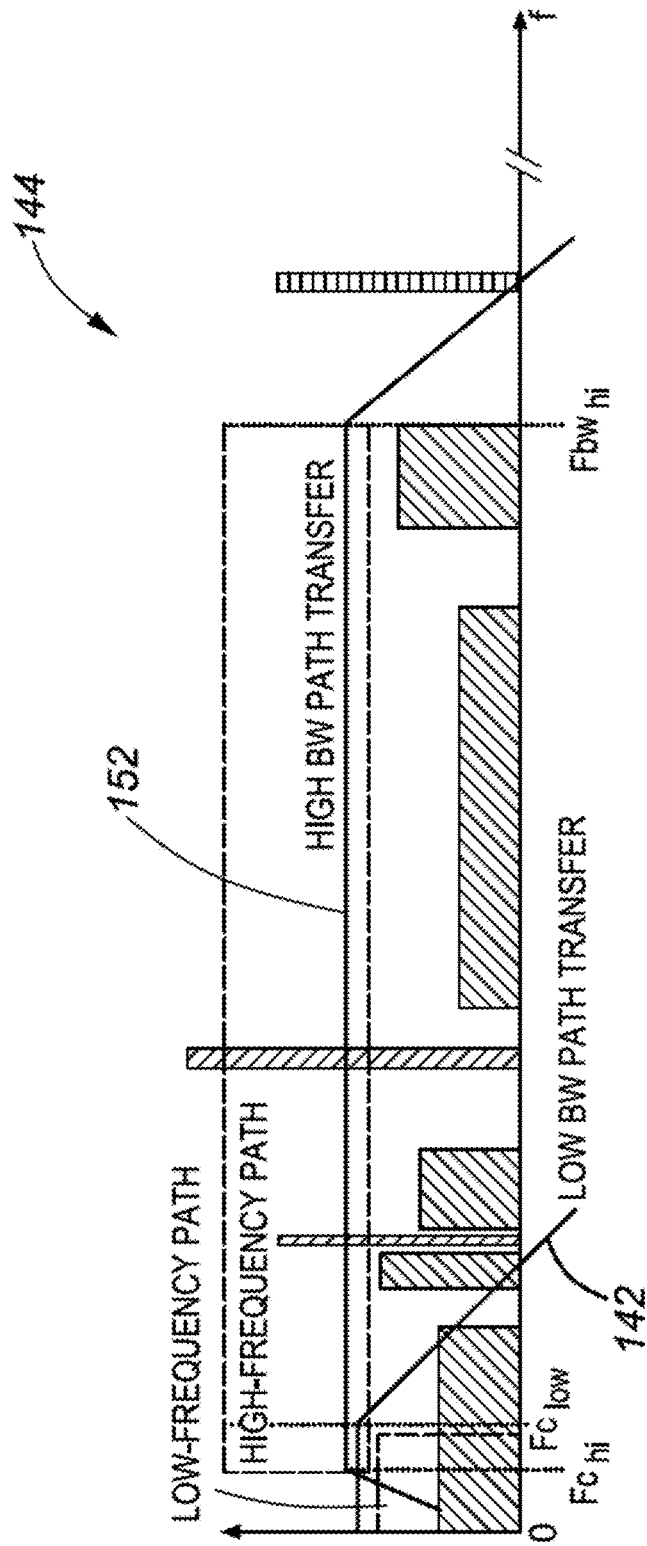
FIG. 6 illustrates an input signal spectrum showing the baseband signal diplexing.

The input to the analog baseband section has an input spectrum. FIGS. 5 and 6 illustrate the input to FIG. 4, with some behaviors of FIG. 4 being shown in FIGS. 5 and 6.

FIG. 5 illustrates an input spectrum 132 to the analog baseband section 106, in which signals 134 are the desired signals, signals 136 are the "IB", or in-band blockers, and signals 138 are the "OoB", or out-of-band blockers. FIG. 5 also illustrates an input signal spectrum showing the frequency ranges 140 and 150 of the low and high frequency paths, respectively.

FIG. 6 illustrates the input signal spectrum of FIG. 5 showing the baseband signal diplexing by illustrating a low bandwidth path transfer function 142 and a high bandwidth path transfer function 152. Diplexing is evident by the fact that the input spectrum is multiplexed into two bands, a high-frequency band, and a low-frequency band. The term "bandwidth" refers to the frequency performance of a cascade of amplifiers, while the term "high/low frequency" refers to a band of frequencies in the spectrum under consideration. It is important to note that the analog diplexing need not remove the low frequency content of the high-frequency path (as a conventional diplexer would do), as shown by the overlap of the low and high bandwidth path transfer functions 142 and 152; this can also be done in DSP. This is what is meant above by "pseudo-diplexing".

Figure 7:
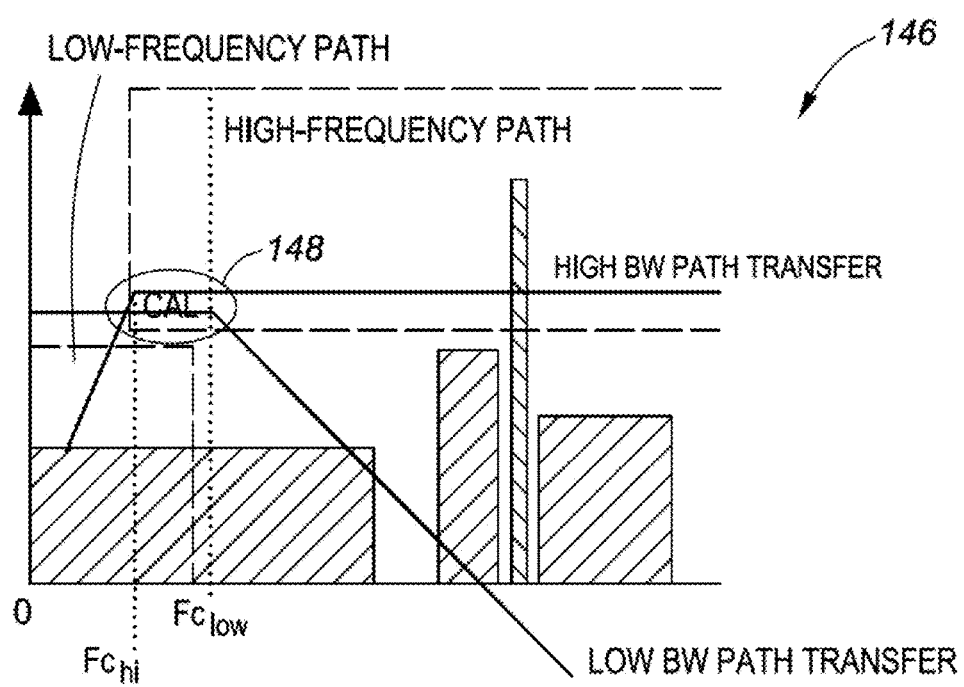
FIG. 7 illustrates an input signal spectrum and diplexing showing overlapping diplexing responses to aid in calibration of the two paths.

FIG. 7 illustrates a magnified view of the input signal spectrum of FIG. 6 showing overlapping diplexing responses to aid in calibration of the two paths. As shown in FIG. 7, the diplexed low-frequency and high-frequency responses are designed to be overlapping so that a calibration zone 148 can be established. In an example embodiment, the calibration zone 148 is defined by the frequencies at which the high and low frequency transfer functions begin and end their constant response. For example, in FIG. 7 the beginning of the calibration zone 148 is defined by the frequency $Fc_{hi}$ at which the high bandwidth transfer function changes from filtering out low frequencies to permitting the higher frequencies to pass through. The end of the calibration zone 148 is defined by the frequency $Fc_{low}$ at which the low bandwidth transfer function changes from a flat response permitting signals to pass through, to a downward response filtering out higher frequencies.

In DSP, the "cal" segment of the high-frequency response is established as a reference signal for the low-frequency response. To calibrate the two responses, the frequency response 142 of the low-frequency path is adjusted until the two signals sufficiently match each other in the calibration zone 148.

Figure 8:
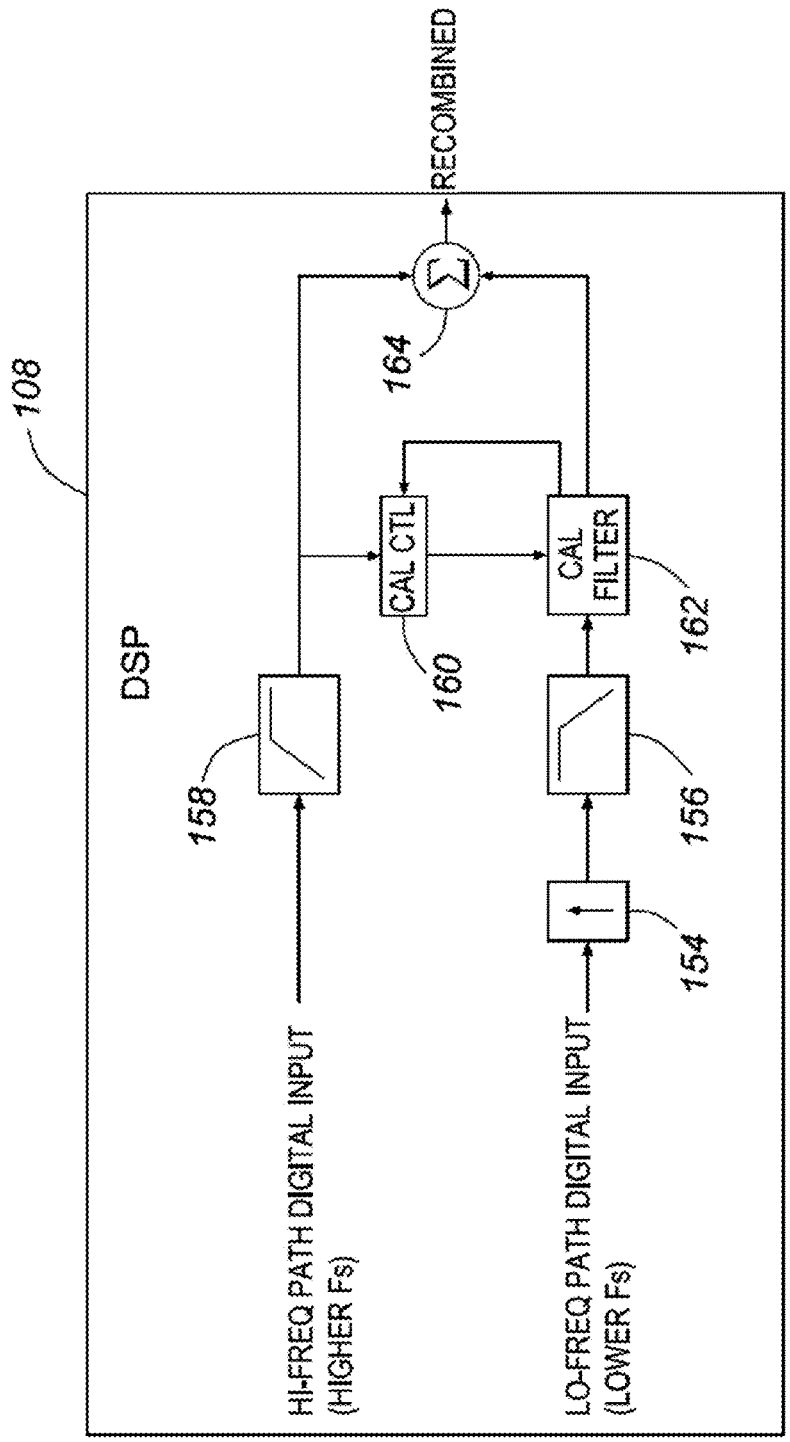
FIG. 8 illustrates a graphical view of calibration of two paths.

FIG. 8 illustrates components provided in a DSP 108 that can be used to perform the calibration of two paths as described in relation to FIG. 7. As shown in FIG. 8, the DSP 108 comprises a low pass filter 156 in the low-frequency path and a high pass filter 158 in the high-frequency path. The output of the high pass filter 158 is provided as an input to a calibration controller 160. The output of the calibration controller 160, and the output of the low pass filter 156, are both provided as inputs to a calibration filter 162. The output of the calibration filter 162 and the output of the high pass filter 158 are provided to an adder 164, where the low and high frequency components are recombined.

At the low-frequency path input, an up-sampler 154 provides up-sampling, so that the sample rates of the low- and high-frequency paths are the same, and to enable comparison of signals at the output of 158 and 156. The calibration controller 160 receives the output of the calibration filter 162 as an input, and compares the amplitude and phase of the calibration filter 162 output to the amplitude and phase of the high pass filter 158 output. The calibration controller 160 adjusts the calibration filter 162 until the calibration filter output matches the high pass filter output.

Figure 9:
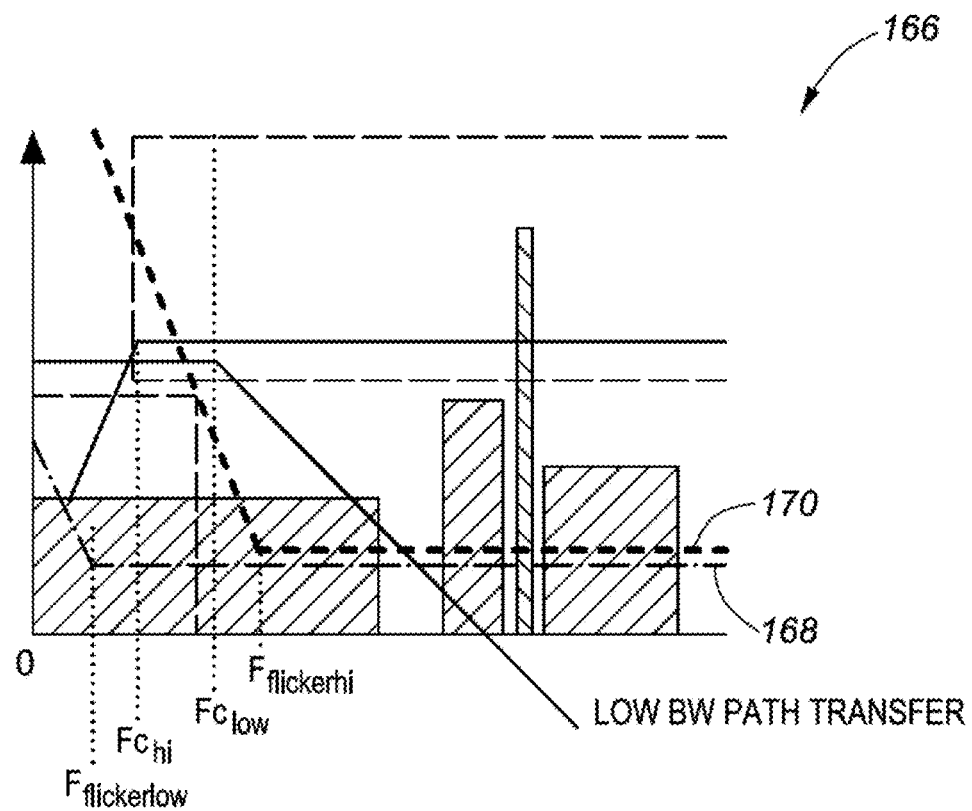
FIG. 9 illustrates an input spectrum showing the relative flicker noise performance of the two paths.

FIG. 9 illustrates an input spectrum showing the relative flicker noise requirements of the two paths. Note that the low frequency path flicker noise performance 168 stabilizes at a frequency $F_{flickerlow}$, which is lower than $Fc_{hi}$ and below the calibration zone 148. The low frequency flicker noise performance is much better than the high frequency path flicker noise performance 170, which stabilizes at a frequency $F_{flickerhi}$, which is higher than $Fc_{low}$ above the calibration zone 148. This is an aspect of embodiments of the present disclosure which allows the high-frequency path to be optimized for high bandwidth while relaxing flicker noise, which in turn reduces dissipated power.

In an implementation, the low frequency path is introduced to reduce the power of the high frequency path, by relaxing the flicker noise requirements of high frequency path. In order to also make the low frequency path power efficient, it is desirable to use a relatively low sample rate ADC in this path. However, this will make aliasing more problematic. Accordingly, embodiments of the present disclosure provide a means to ease the anti-aliasing requirements of this path.

Figure 10:
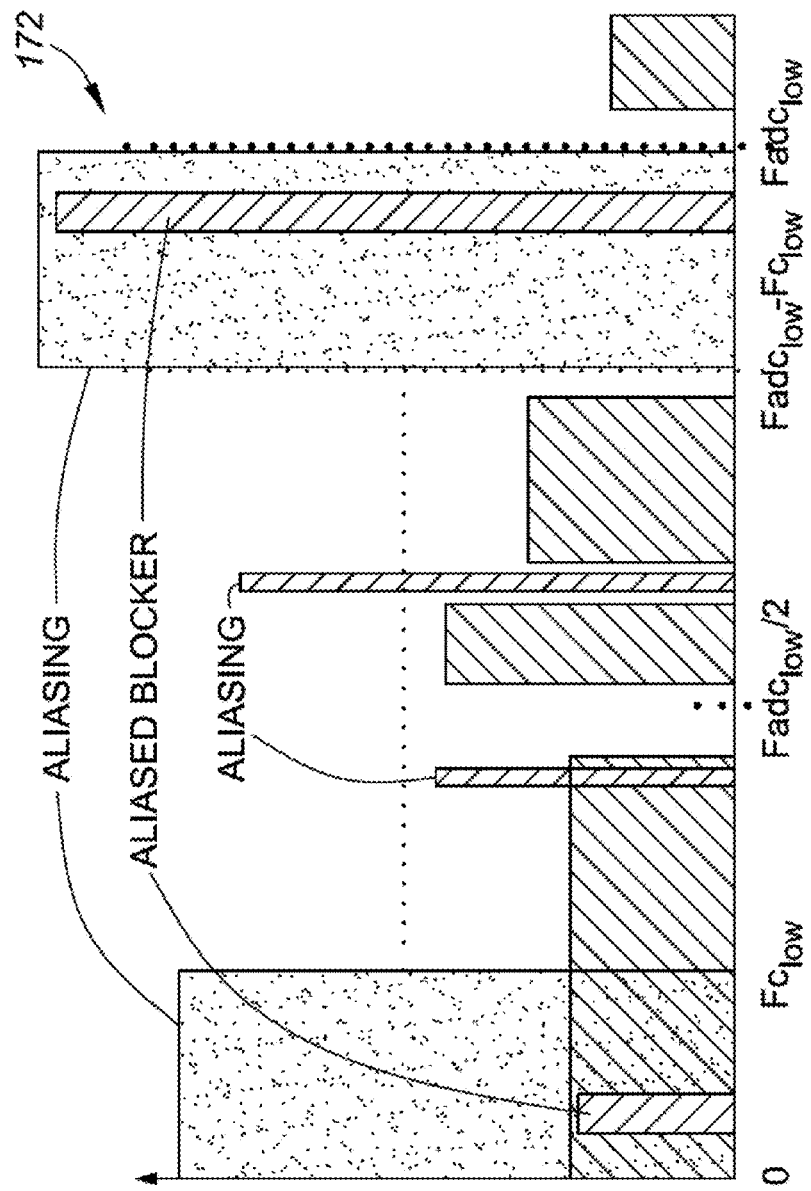
FIG. 10 illustrates an input spectrum with an aliasing zone highlighted.

FIG. 10 illustrates an input spectrum showing some outputs along the low frequency path of FIG. 8, with an aliasing zone highlighted. An in-band blocker is shown aliasing from the high-frequency portion of the signal into the low frequency portion of the signal.

As shown in FIG. 10, the relatively high frequency signals can be aliased in the low frequency path. There is prior knowledge of high frequency content in the input signal because of the existence of the high-frequency path in which there is no aliasing. In FIG. 10, $F_{adclow}$ is the sample rate of the ADC in the low frequency path.

In some approaches, to avoid this aliasing problem the frequency response for any sampled analog path is set using analog filtering to have a sharp enough roll-off to sufficiently reduce signals in the aliasing zone. However, making this low frequency response sharp enough can increase the power of this path due to the increased filtering demands. Embodiments of the present disclosure provide an alternative solution to this problem, as described below.

In some implementations, it is desirable to reduce aliasing without analog filtering. The aliasing in the low frequency path is caused by the residual high frequency content on this path, as shown in FIG. 10. But the high frequency content is known from the other high frequency path.

A method according an embodiment of the present disclosure comprises measuring both the high frequency content of the signal in the high frequency path, and the residual of this high frequency content in the low frequency path, and determining an aliasing correlation based on the relationship therebetween. The term "aliasing correlation" is used herein to represent a correlation between how much high-frequency content in the signal (measured in the non-aliased high-frequency path) shows up in the low frequency path. The high-frequency path is used to determine how high-frequency signals will be aliased in the low-frequency path, according to the aliasing correlation. The aliasing correlation can be used in DSP to reduce the aliasing. This will relax the analog diplexing requirements of the low frequency path.

Figure 11:
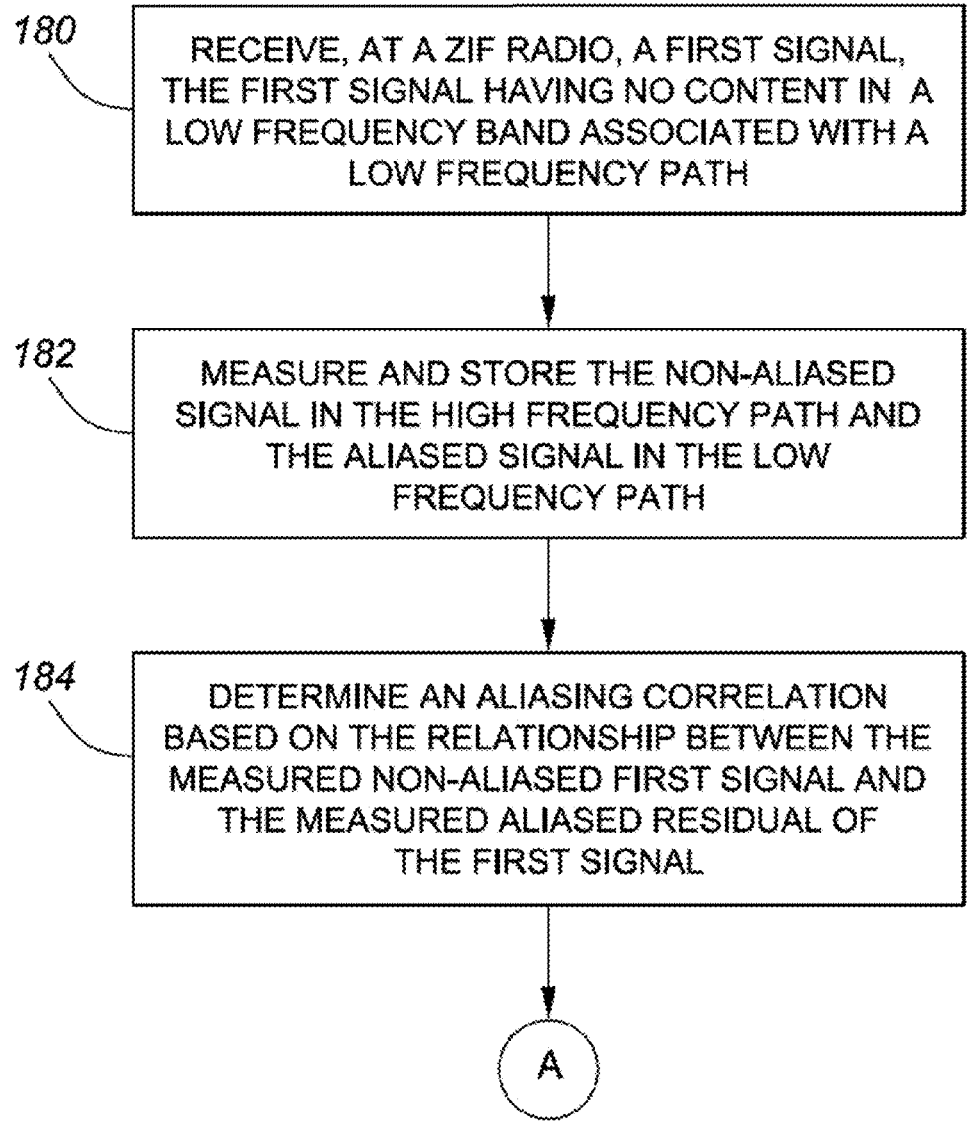
FIG. 11 illustrates a method to compute an aliasing correlation according to an embodiment of the present disclosure.

FIG. 11 illustrates a method to compute an aliasing correlation according to an example embodiment of the present disclosure. In an embodiment, the method comprises, at 180, receiving a first signal at a ZIF radio, the first signal having no content in a low frequency band, or being non-aliased in the high frequency path. In an embodiment, the first signal is a test signal. In an example embodiment, the test signal is received in an analog baseband section of a ZIF radio having a low frequency path and a high frequency path, the low and high frequency paths being independently optimized for low and high frequency noise performance, respectively.

At 182, the method comprises measuring the first signal, or non-aliased test signal, in the high frequency path, and the aliased residual of the first signal in the low frequency path. The method can further include storing the measured first signal and the measured aliased residual of the first signal. At 184, the method comprises determining an aliasing correlation based on the relationship between the measured non-aliased first signal and the measured aliased residual of the test signal. In an example embodiment, the method further comprises at 186 applying aliasing compensation to a second received signal based on the determined aliasing correlation. In an example embodiment, the second received signal comprises a signal received at the direct conversion radio receiver after receipt of the first signal.

Figure 12:
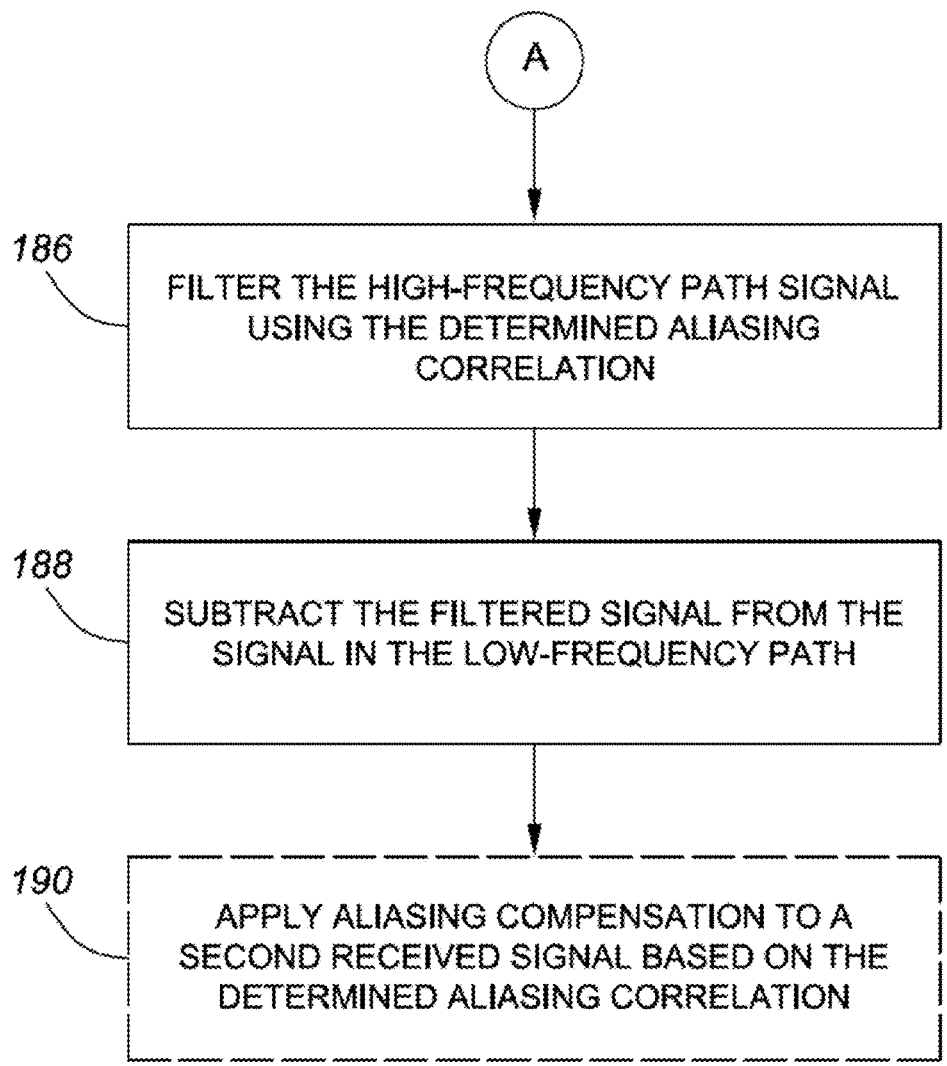
FIG. 12 illustrates a method to reduce aliasing effects based on a computed aliasing correlation according to an example embodiment of the present disclosure.

FIG. 12 illustrates a method to reduce aliasing effects based on a determined aliasing correlation according to an example embodiment of the present disclosure. In an example embodiment, the method of FIG. 12 is performed following the determination of an aliasing correlation, for example such as calculated in FIG. 11. Knowledge regarding the determined aliasing correlation is advantageously used to reduce aliasing effects in signals, for example in signals received after the test signal.

At 188, the method comprises filtering the high-frequency path signal using the determined complex aliased response. In an example embodiment, the output of 186 comprises a filtered high-frequency path signal. At 190, the method further comprises subtracting the filtered high-frequency path signal from the signal in the low-frequency path. In an example embodiment, the output of 188 is a version of the original input signal that has been filtered and for which aliasing has been reduced. In an example embodiment, steps 188 and 190 are performed at, or in, a DSP.

Figure 13:
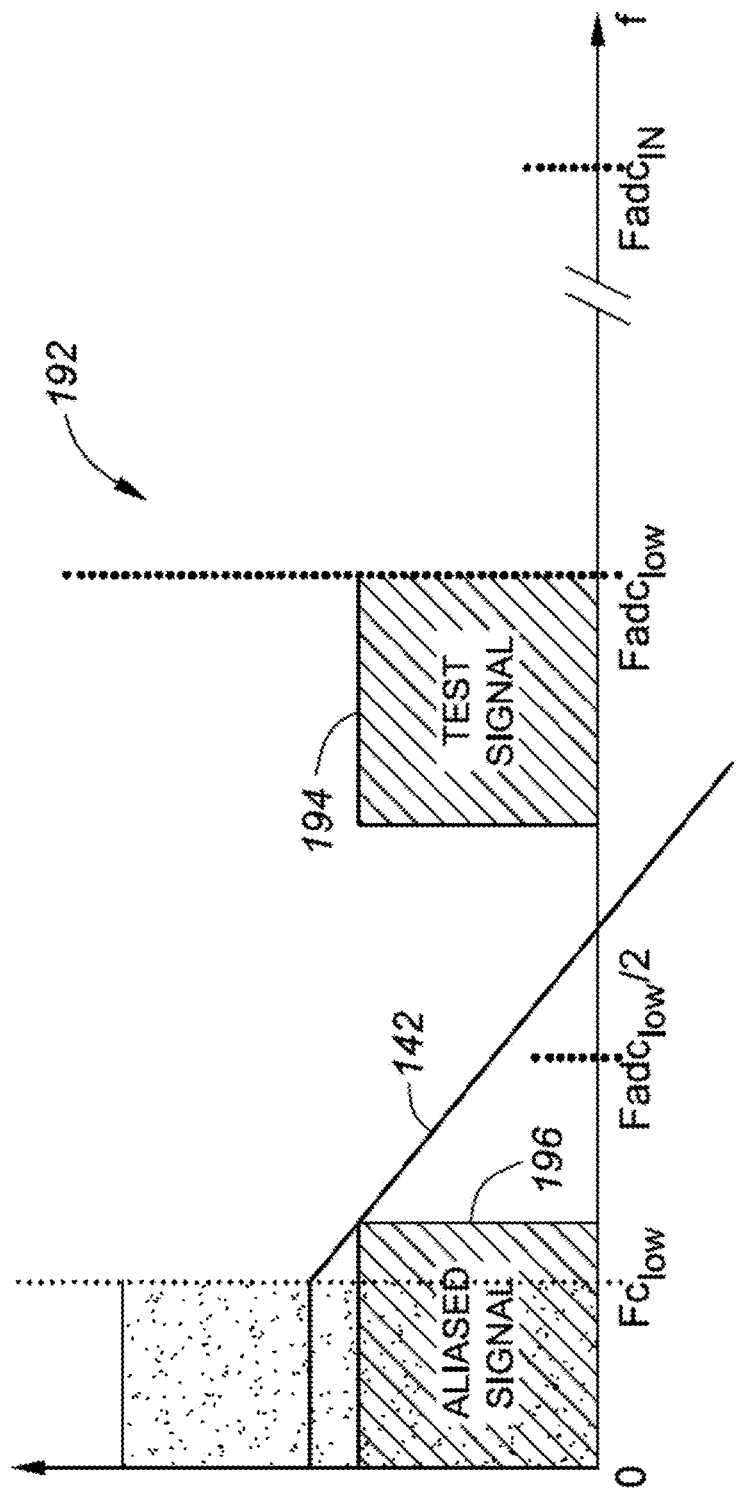
FIG. 13 is a graph illustrating a relationship between the frequency spectrum and components of the method to compute the aliasing correlation.

FIG. 13 is a graph illustrating a relationship between the frequency spectrum and components of the method to compute the aliasing correlation. In particular, FIG. 13 shows the aliasing of the low frequency path. As shown in FIG. 13, the first signal, or test signal, 194 described in relation to FIG. 11 is provided at a frequency that is higher than the low bandwidth transfer function 142 such that it is partially, but not fully, filtered out, and the residual amount generates an aliased signal 196 that becomes noise in the low frequency path.

Figure 14:
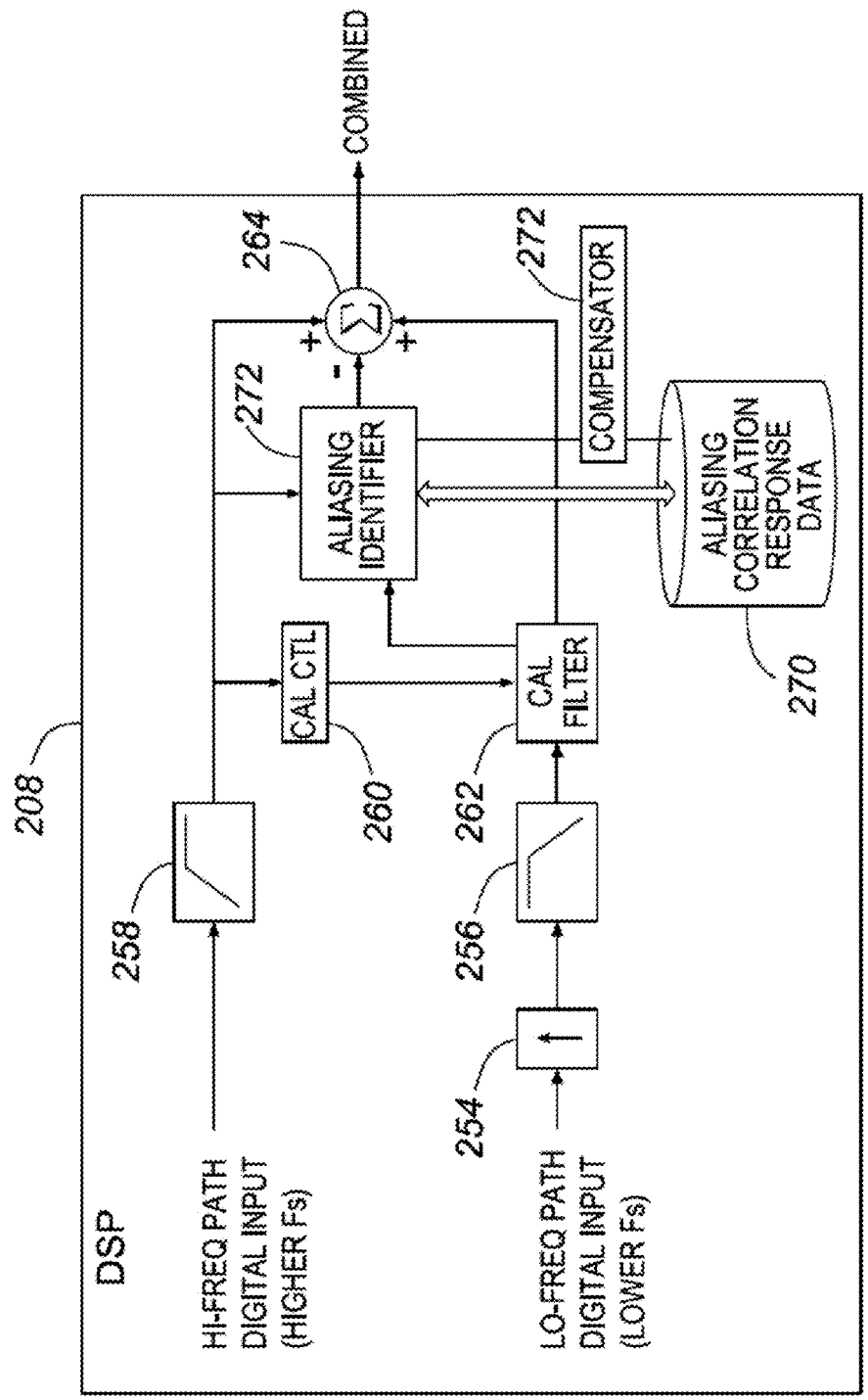
FIG. 14 illustrates how the aliasing correlation can be used in DSP to reduce the aliasing signal according to an embodiment of the present disclosure.

FIG. 14 illustrates a digital signal processor 208 including aliasing correlation and associated response data according to an embodiment of the present disclosure. FIG. 14 illustrates how the aliasing correlation can be used in the DSP 208 to reduce the aliasing signal. In FIG. 14, the operation and interactions of the up-sampler 254, the low pass filter 256, the high pass filter 258, the calibration controller 260, the calibration filter 262 and the adder 264 are similar to the operation and interactions of the up-sampler 154, the low pass filter 156, the high pass filter 158, the calibration controller 160, the calibration filter 162 and the adder 164 in FIG. 8.

In an example embodiment shown in FIG. 14, the DSP 208 includes a memory or database 272 storing aliasing correlation response data and relationships, for example based on test signals and the method described in relation to FIG. 11. The DSP 208 can also comprise a receiver including a non-transitory machine-readable memory, the receiver configured to receive and store the aliasing correlation response data and relationships. A compensator 272 is provided in communication with the memory 270 to apply aliasing compensation to a received signal. In an example embodiment, the DSP 208 has access to all the digital signals along the paths in FIG. 14, and to the memory 270 storing the aliasing correlation response data.

In an embodiment, the DSP 208 is for use in a direct conversion radio receiver having a low frequency path and a high frequency path. In an example embodiment, the DSP 208 comprises an aliasing identifier 272 in communication with the low frequency path and the high frequency path to obtain aliasing correlation response data associating a measured non-aliased signal in the high frequency path and a measured aliased residual of the signal in the low frequency path. In an example embodiment, the DSP comprises a compensator 274 in communication with the aliasing identifier 272 to apply aliasing compensation to received signals based on the obtained aliasing correlation response data. In an example embodiment, the memory 270 comprises a non-transitory machine-readable memory in communication with the aliasing identifier 272 and the compensator 274 and configured to store the obtained aliasing correlation response data. In an example embodiment, the aliasing identifier 272 and the compensator 274 are integral with one another.

Embodiments of the present disclosure provide a technique to reduce the dissipated power of a high bandwidth ZIF radio receiver, or direct conversion radio receiver. ZIF receivers are very popular in the mobile and wireless industry, and reductions in power in this industry are a high priority.

Embodiments of the present disclosure provide for the use of diplexing in the analog baseband section of a ZIF receiver with overlapping spectra to calibrate the two diplexed signals in the digital domain. Embodiments of the present disclosure provide for the use of "pseudo" diplexing in which the higher frequency path can still contain signal content in the frequency range of the low frequency path. Embodiments of the present disclosure further provide the computation and use of a aliasing correlation to reduce aliasing effects and to reduce the anti-aliasing filter requirements of the diplexed low frequency path.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method of reducing aliasing during signal processing at a direct conversion radio receiver having a low frequency path and a high frequency path, the method comprising:
   receiving a first signal, the first signal having no content in a low frequency band associated with the low frequency path;
   measuring the first signal in the high frequency path, the first signal being non-aliased in the high frequency path;
   measuring an aliased residual of the first signal in the low frequency path;
   determining an aliasing correlation based on a relationship between the measured non-aliased first signal and the measured aliased residual of the first signal; and
   applying aliasing compensation to a second received signal based on the determined aliasing correlation.

2. The method of claim 1 wherein the first signal is received in an analog baseband section of the direct conversion radio having a low frequency path and a high frequency path, the low and high frequency paths being independently optimized for low and high frequency noise performance, respectively.

3. The method of claim 1 wherein the first signal is a test signal provided at a frequency that is higher a transfer function associated with the low frequency path such that it is filtered out of the low frequency path and generates the aliased residual signal that is unfiltered by the transfer function associated with the low frequency path.

4. The method of claim 1 further comprising storing the measured first signal, the measured aliased residual of the first signal, and the determined aliasing correlation in a non-transitory machine readable memory in a digital signal processor (DSP).

5. The method of claim 1 further comprising:
filtering a high-frequency path component of the second received signal using the determined aliasing correlation; and
subtracting the filtered high-frequency path component of the second received signal from a low-frequency component of the second received signal in the low-frequency path to produce an aliasing-reduced version of the second received signal.

6. The method of claim 1 further comprising:
obtaining aliasing correlation response data associating the measured non-aliased first signal in the high frequency path and the measured aliased residual of the signal in the low frequency path, and
the aliasing correlation is determined based on the obtained aliasing correlation response data.

7. A non-transitory machine readable medium having stored thereon statements and instructions for execution by a processor to perform a method of reducing aliasing during signal processing at a direct conversion radio receiver having a low frequency path and a high frequency path, the processor-implemented method comprising:
receiving a first signal, the first signal having no content in a low frequency band associated with the low frequency path;
measuring the first signal in the high frequency path, the first signal being non-aliased in the high frequency path;
measuring an aliased residual of the first signal in the low frequency path;
determining an aliasing correlation based on a relationship between the measured non-aliased first signal and the measured aliased residual of the first signal; and
applying aliasing compensation to a second received signal based on the determined aliasing correlation.

8. A digital signal processor (DSP) for use in a direct conversion radio receiver having a low frequency path and a high frequency path, the DSP comprising:
an aliasing identifier in communication with the low frequency path and the high frequency path to obtain aliasing correlation response data associating a measured non-aliased signal in the high frequency path and a measured aliased residual of the signal in the low frequency path; and
a compensator in communication with the aliasing identifier to apply aliasing compensation to received signals based on the obtained aliasing correlation response data.

9. The DSP of claim 8 further comprising a non-transitory machine-readable memory in communication with the aliasing identifier and configured to store the obtained aliasing correlation response data.

10. The DSP of claim 8 further comprising:
a calibration controller in communication with the high frequency path; and
a calibration filter in communication with the low frequency path and with the calibration controller to adjust a frequency response of the low frequency path until the frequency response of the low frequency path sufficiently matches the frequency response of the high frequency path in a calibration zone.

11. The DSP of claim 10 further comprising a high pass filter in the high frequency path, and wherein the calibration controller receives an output of the calibration filter as an input, and compares the amplitude and phase of the calibration filter output to the amplitude and phase of an output of the high pass filter, and the calibration controller adjusts the calibration filter until the output of the calibration filter matches the output of the high pass filter.

12. A direct conversion radio receiver comprising:
a high frequency content path comprising first analog circuitry configured to filter and process high frequency content of the analog signal;
a low frequency content path comprising second analog circuitry configured to filter and process low frequency content of the analog signal, the second analog circuitry configured to process the low frequency content separate from and in parallel with the processing of the high frequency content by the first analog circuitry;
a digital signal processor (DSP) including:
a non-transitory machine-readable memory storing aliasing correlation response data associating a measured non-aliased signal in the high frequency path and a measured aliased residual of the signal in the low frequency path; and
a compensator in communication with the memory to apply aliasing compensation to received signals based on the stored aliasing correlation response data.

13. The direct conversion radio receiver of claim 12 further comprising: an aliasing identifier in communication with the low frequency path and the high frequency path to obtain the aliasing correlation response data.

14. An analog baseband circuit for use in processing an analog signal in a direct conversion radio receiver, the circuit comprising:
a high frequency content path comprising first analog circuitry configured to filter and process high frequency content of the analog signal; and
a low frequency content path comprising second analog circuitry configured to filter and process low frequency content of the analog signal, the second analog circuitry configured to process the low frequency content separate from and in parallel with the processing of the high frequency content by the first analog circuitry, wherein the high frequency content path is characterized by a first transfer function, and the low frequency content path is characterized by a second transfer function that overlaps with the first transfer function to create a calibration zone used to calibrate the first and second transfer functions.

* * * * *